US012707510B2

(12) United States Patent
Lyu et al.

(10) Patent No.: US 12,707,510 B2
(45) Date of Patent: Aug. 11, 2026

(54) METHOD AND APPARATUS FOR SIDELINK COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/823,396

(22) Filed: Sep. 3, 2024

(65) Prior Publication Data

US 2024/0430956 A1 Dec. 26, 2024

Related U.S. Application Data

(63) Continuation of application No. PCT/CN2023/096353, filed on May 25, 2023.

(51) Int. Cl.
*H04W 74/08* (2024.01)
*H04L 5/00* (2006.01)
*H04W 74/00* (2009.01)

(52) U.S. Cl.
CPC ....... *H04W 74/0875* (2013.01); *H04L 5/0094* (2013.01); *H04W 74/002* (2013.01)

(58) Field of Classification Search
CPC ........... H04W 74/002; H04W 74/0875; H04W 72/044; H04W 74/0808
See application file for complete search history.

(56) References Cited

U.S. PATENT DOCUMENTS

2018/0139082 A1* 5/2018 Chen ..................... H04L 5/0007
2020/0313946 A1* 10/2020 Sun ..................... H04L 27/2605
2021/0194740 A1* 6/2021 Aldana ............. H04W 72/1268
2023/0146161 A1* 5/2023 Sun ..................... H04L 27/2607 370/329
2023/0319872 A1* 10/2023 Xue ...................... H04W 16/14 370/329
2024/0276545 A1* 8/2024 Lin ....................... H04W 16/14
2024/0349333 A1* 10/2024 Niu .................. H04W 74/0808
(Continued)

FOREIGN PATENT DOCUMENTS

CN 115299019 11/2022
CN 115589596 1/2023

OTHER PUBLICATIONS

Huawei et al., "Channel access mechanism and resource allocation for sidelink operation over unlicensed spectrum," 3GPP TSG-RAN WG1 Meeting #113, R1-2304661, Incheon, Korea, May 22-26, 2023, 36 pages.

(Continued)

*Primary Examiner* — Liton Miah
(74) *Attorney, Agent, or Firm* — Fish & Richardson P.C.

(57) ABSTRACT

Disclosed are a method and an apparatus for sidelink communication. An example method includes determining, by a first terminal device, one or more access point extensions (CPEs) corresponding to a first shared resource, and the one or more CPEs are determined based on a subcarrier spacing corresponding to the first shared resource, and the one or more CPEs are used by the first terminal device to receive a sidelink channel on the first shared resource.

18 Claims, 4 Drawing Sheets

(56) References Cited

U.S. PATENT DOCUMENTS

2025/0219882 A1* 7/2025 Lu ....................... H04L 27/2607
2026/0032707 A1* 1/2026 Guo ...................... H04L 5/0094

OTHER PUBLICATIONS

International Search Report and Written Opinion in International Appln. No. PCT/CN2023/096353, mailed on Feb. 4, 2024, 18 pages (with English machine translation).
Qualcomm Incorporated, "Channel access mechanism for Sidelink on Unlicensed Spectrum," 3GPP TSG RAN WG1 Meeting #113, R1-2305337, Incheon, Korea, May 22-26, 2023, 37 pages.

* cited by examiner

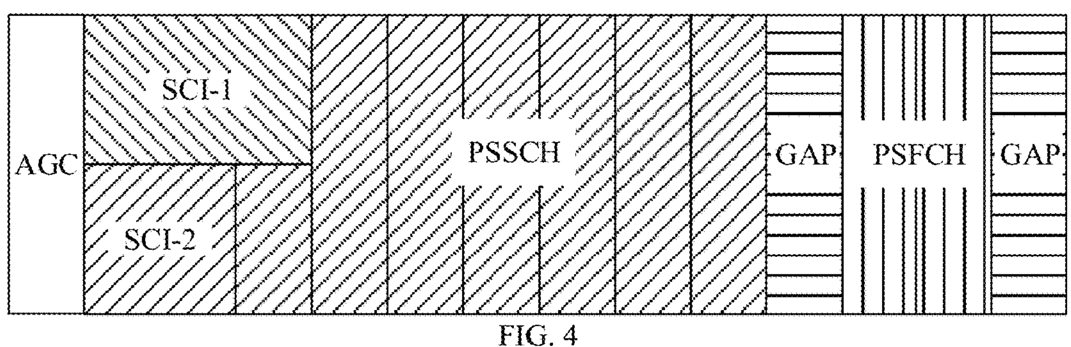
FIG. 4
The first terminal device determines first configuration information of a first shared resource
S510
FIG. 5
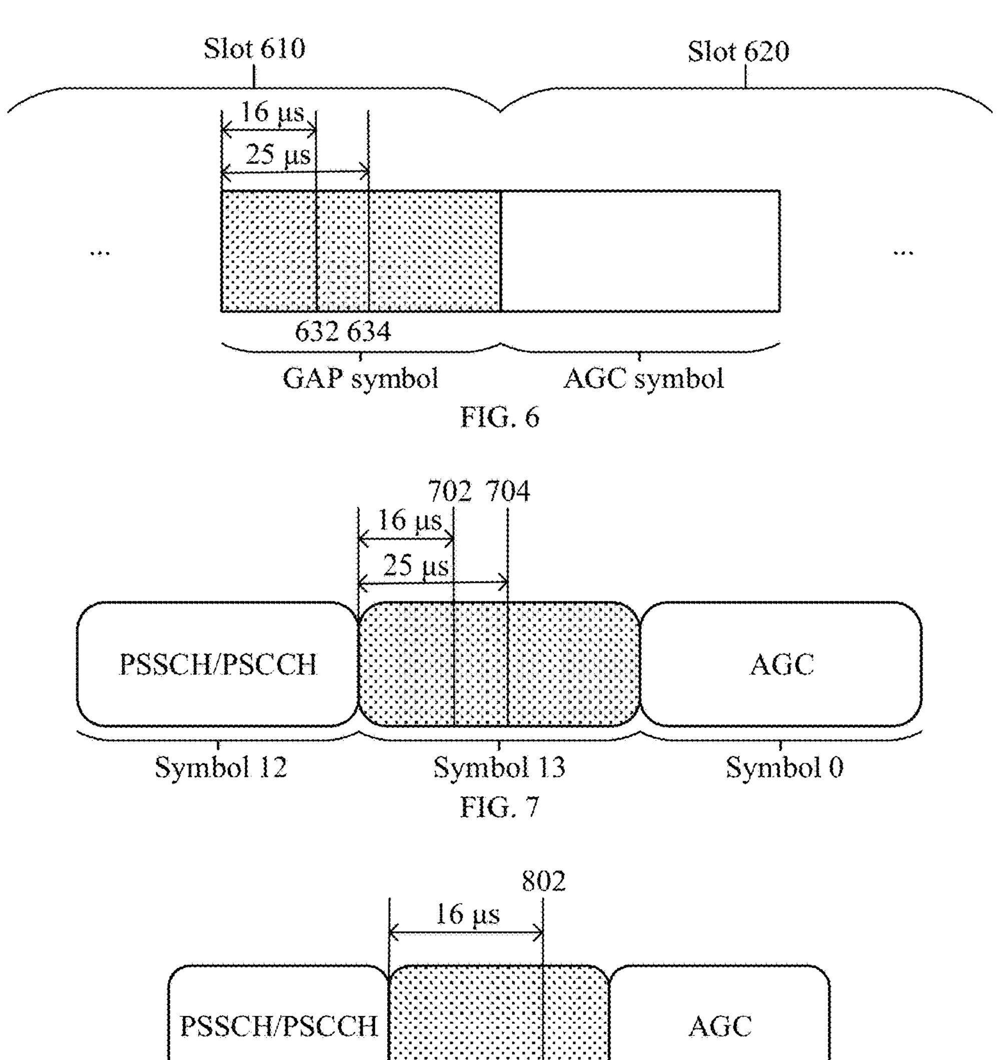
FIG. 8

METHOD AND APPARATUS FOR SIDELINK COMMUNICATION

CROSS-REFERENCE TO RELATED APPLICATIONS

The present application is a continuation of PCT Patent Application No. PCT/CN 2023/096353, filed on May 25, 2023, the disclosure of which is hereby incorporated by reference in its entirety.

TECHNICAL FIELD

The present application relates to the field of communication technologies, and more specifically, to a method and an apparatus for sidelink communication.

BACKGROUND

During sidelink communication on a shared spectrum, a terminal device may perform channel monitoring through a mechanism such as listen before talk (LBT). When the channel monitoring is successful, the terminal device may obtain a channel resource and perform access and sidelink transmission at a channel access location.

However, when a plurality of terminal devices perform channel access through LBT, there may be a conflict at a channel access location.

SUMMARY

The present application provides a method and an apparatus for sidelink communication. Various aspects of embodiments of the present application are described below.

According to a first aspect, a method for sidelink communication is provided, including: A first terminal device determines first configuration information of a first shared resource. The first configuration information indicates one or more access point extensions (CPEs) corresponding to the first shared resource. The one or more CPEs are determined based on a subcarrier spacing corresponding to the first shared resource. The one or more CPEs are used by a second terminal device to determine a time domain location for accessing the first shared resource.

According to a second aspect, an apparatus for sidelink communication is provided. The apparatus is a first terminal device. The first terminal device includes: a determining unit, configured to determine first configuration information of a first shared resource. The first configuration information indicates one or more CPEs corresponding to the first shared resource. The one or more CPEs are determined based on a subcarrier spacing corresponding to the first shared resource. The one or more CPEs are used by a second terminal device to determine a time domain location for accessing the first shared resource.

According to a third aspect, a communications apparatus is provided. The communications apparatus includes a memory and a processor. The memory is configured to store a program. The processor is configured to invoke the program in the memory to perform the method according to the first aspect.

According to a fourth aspect, an apparatus is provided, and the apparatus includes a processor configured to invoke a program from a memory to perform the method according to the first aspect.

According to a fifth aspect, a chip is provided, and the chip includes a processor configured to invoke a program from a memory to enable a device installed with the chip to perform the method according to the first aspect.

According to a sixth aspect, a computer-readable storage medium is provided, and the computer-readable storage medium stores a program that enables a computer to perform the method according to the first aspect.

According to a seventh aspect, a computer program product is provided, and the computer program product includes a program that enables a computer to perform the method according to the first aspect.

According to an eighth aspect, a computer program is provided. The computer program enables a computer to perform the method according to the first aspect.

In embodiments of the present application, first configuration information may indicate one or more CPEs used by a second terminal device to access first shared resource. These CPEs are determined based on a subcarrier spacing of the first shared resource. The subcarrier spacing is related to a time length of a time unit in time domain. Therefore, it can be ensured that there are one or more CPEs in a time unit at which a terminal device performs channel access. Further, these CPEs may be used for managing channel access locations of a plurality of terminal devices, to reduce occurrence of an access conflict between the plurality of terminal devices.

BRIEF DESCRIPTION OF THE DRAWINGS

FIG. 4 is a schematic diagram of a frame structure that carries a PSFCH.

FIG. 5 is a schematic flowchart of a method for sidelink communication according to an embodiment of the present application.

FIG. 6 is a schematic diagram of a possible implementation of CPE configuration.

FIG. 7 is a schematic diagram of another possible implementation of CPE configuration.

FIG. 8 is a schematic diagram of still another possible implementation of CPE configuration.

DETAILED DESCRIPTION OF THE EMBODIMENTS

The technical solutions in embodiments of the present application are described below with reference to the accompanying drawings in embodiments of the present application. Apparently, the described embodiments are merely a part rather than all of embodiments of the present application. All other embodiments obtained by a person of ordinary skill in the art based on embodiments of the present application without creative efforts shall fall within the protection scope of the present application.

Figures 1, 2, 3:
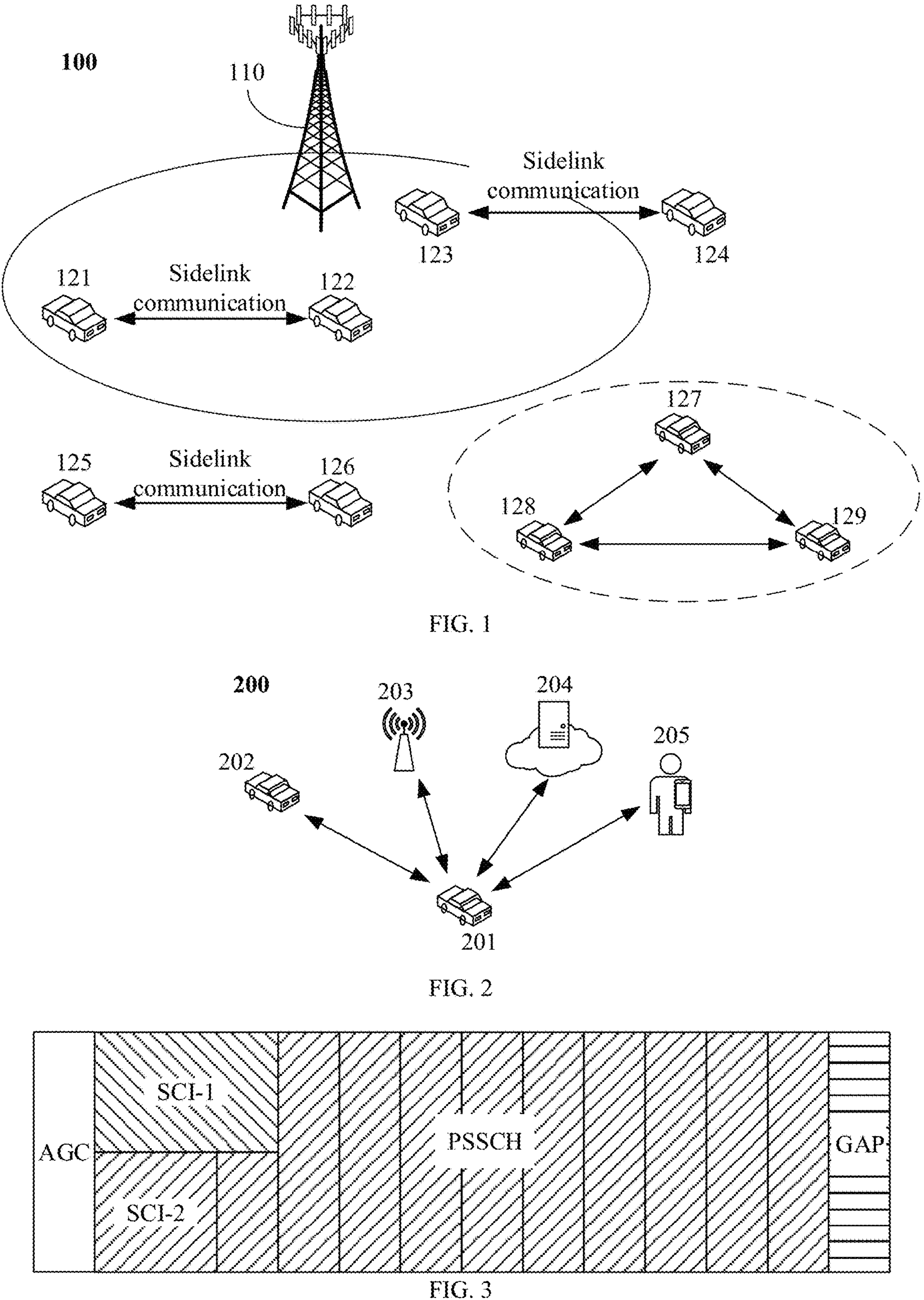
FIG. 1 shows a wireless communications system to which an embodiment of the present application is applied.
FIG. 2 is an example diagram of communication of new radio (NR)-vehicle-to-everything (V2X).
FIG. 3 is a schematic diagram of a frame structure that does not carry a physical sidelink feedback channel (PSFCH).

FIG. 1 is an example diagram of a system architecture of a wireless communications system 100 to which an embodiment of the present application is applicable. The wireless communications system 100 may include a network device 110 and terminal devices 121 to 129. The network device 110 can provide communication coverage for a specific geographic area, and can communicate with terminals within the coverage area.

In some implementations, terminal devices may communicate with each other through a sidelink (SL). The sidelink communication may also be referred to as proximity services (ProSe) communication, unilateral communication, side link communication, device-to-device (D2D) communication, or the like.

In other words, sidelink data is transmitted between terminal devices over a sidelink. The sidelink data may include data and/or control signalling. In some implementations, the sidelink data may be, for example, a physical sidelink control channel (PSCCH), a physical sidelink shared channel (PSSCH), a PSCCH demodulation reference signal (DMRS), a PSSCH DMRS, or a PSFCH.

Several common sidelink communication scenarios are described below with reference to FIG. 1. Sidelink communication may include three scenarios depending on whether terminal devices on a sidelink are within coverage of a network device. In a scenario 1, the terminal devices perform sidelink communication within the coverage of the network device. In a scenario 2, some of the terminal devices perform sidelink communication within the coverage of the network device. In a scenario 3, the terminal devices perform sidelink communication outside the coverage of the network device.

As shown in FIG. 1, in the scenario 1, terminal devices 121 and 122 can communicate with each other over a sidelink, and the terminal devices 121 and 122 are both within the coverage of the network device 110. In other words, the terminal devices 121 and 122 are both within the coverage of the same network device 110. In this scenario, the network device 110 may send configuration signalling to the terminal devices 121 and 122, and accordingly, the terminal devices 121 and 122 communicate with each other over the sidelink based on the configuration signalling.

As shown in FIG. 1, in the scenario 2, terminal devices 123 and 124 can communicate with each other over a sidelink, the terminal device 123 is within the coverage of the network device 110, and the terminal device 124 is outside the coverage of the network device 110. In this scenario, the terminal device 123 receives configuration information from the network device 110, and communicates over the sidelink based on configuration of configuration signalling. However, since the terminal device 124 is outside the coverage of the network device 110, the terminal device 124 cannot receive configuration information from the network device 110. In this case, the terminal device 124 may obtain configuration of sidelink communication based on preconfigured (pre-configuration) configuration information and/or configuration information sent by the terminal device 123 within the coverage, so as to communicate with the terminal device 123 over the sidelink based on the obtained configuration.

In some cases, the terminal device 123 may send the configuration information to the terminal device 124 through a physical sidelink broadcast channel (PSBCH), to configure the terminal device 124 to communicate over the sidelink.

As shown in FIG. 1, in the scenario 3, terminal devices 125 to 129 are all outside the coverage of the network device 110 and cannot communicate with the network device 110. In this case, all the terminal devices may perform sidelink communication based on preconfigured information.

In some cases, the terminal devices 127 to 129 outside the coverage of the network device may form a communication cluster, and the terminal devices 127 to 129 in the communication cluster may communicate with each other. In addition, the terminal device 127 in the communication cluster may serve as a central control node, also referred to as a cluster header (CH). Correspondingly, the other terminal devices in the communication cluster may be referred to as "cluster members".

The terminal device 127 as the CH may have one or more of the following functions: responsible for establishment of the communication cluster; joining and leaving of the cluster members; resource coordination, allocation of sidelink transmission resources for the cluster members, and reception of sidelink feedback information from the cluster members; resource coordination with another communication cluster; and other functions.

It should be noted that FIG. 1 exemplarily shows one network device and a plurality of terminal devices. Optionally, the wireless communications system 100 may include a plurality of network devices, and another quantity of terminal devices may be included in coverage of each network device. This is not limited in embodiments of the present application.

Optionally, the wireless communications system 100 may further include other network entities such as a network controller and a mobility management entity. This is not limited in embodiments of the present application.

It should be understood that technical solutions in embodiments of the present application may be applied to various communications systems, such as a $5^{th}$ generation (5G) system or an NR system, a long term evolution (LTE) system, an LTE frequency division duplex (FDD) system, and LTE time division duplex (TDD). The technical solutions provided in the present application may be further applied to a future communications system, such as a $6^{th}$ generation mobile communications system or a satellite communications system.

A terminal device in embodiments of the present application may also be referred to as user equipment (UE), an access terminal, a subscriber unit, a subscriber station, a mobile site, a mobile station (MS), a mobile terminal (MT), a remote station, a remote terminal, a mobile device, a user terminal, a wireless communication device, a user agent, a user apparatus, or the like. The terminal device in embodiments of the present application may be a device providing a user with voice and/or data connectivity and capable of connecting people, objects, and machines, such as a handheld device or vehicle-mounted device having a wireless connection function. The terminal device in embodiments of the present application may be a mobile phone, a tablet computer (Pad), a notebook computer, a palmtop computer, a mobile internet device (MID), a wearable device, a vehicle, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Optionally, the terminal device may serve as a base station. For example, the terminal device may serve as a scheduling entity, which provides a sidelink signal between terminal devices in V2X or D2D, or the like. For example, a cellular phone and a car communicate with each other by using sidelink data. A cellular phone and a smart home device communicate with each other, without relay of a communication signal through a base station.

A network device in embodiments of the present application may be a device for communicating with a terminal device. The network device may also be referred to as an access network device or a wireless access network device. For example, the network device may be a base station. The network device in embodiments of the present application may be a radio access network (RAN) node (or device) that connects the terminal device to a wireless network. The base station may broadly cover following various names, or may be replaced with the following names, such as a node B (NodeB), an evolved NodeB (eNB), a next generation NodeB (gNB), a relay station, a transmitting and receiving point (TRP), a transmitting point (TP), an access point (AP), a master eNodeB (MeNB), a secondary eNodeB (SeNB), a multi-standard radio (MSR) node, a home base station, a network controller, an access node, a radio node, a transmission node, a transceiver node, a baseband unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communication module, a modem, or a chip disposed in the devices or apparatus described above. Alternatively, the base station may be a mobile switching center, a device that assumes functions of a base station in D2D, V2X, and machine-to-machine (M2M) communication, a network-side device in a 6G network, a device that assumes functions of a base station in a future communications system, or the like. The base station may support networks of the same or different access technologies. A specific technology and a specific device form used for the network device are not limited in embodiments of the present application.

The base station may be fixed or mobile. For example, a helicopter or an unmanned aerial vehicle may be configured to serve as a mobile base station, and one or more cells may move according to a location of the mobile base station. In another example, a helicopter or an unmanned aerial vehicle may be configured to serve as a device in communication with another base station.

In some deployments, the network device in embodiments of the present application may be a CU or a DU, or the network device includes a CU and a DU. The gNB may further include an AAU.

The network device and the terminal device may be deployed on land, including being indoors or outdoors, handheld or vehicle-mounted, may be deployed on a water surface, or may be deployed on a plane, a balloon, or a satellite in the air. In embodiments of the present application, a scenario in which the network device and the terminal device are located is not limited.

It should be understood that all or some of the functions of the communications device in the present application may also be implemented by software functions running on hardware, or by virtualization functions instantiated on a platform (such as a cloud platform).

For ease of understanding, some related technical knowledge related to embodiments of the present application is first introduced. The following related technologies, as optional solutions, may be randomly combined with the technical solutions of embodiments of the present application, all of which fall within the protection scope of embodiments of the present application. Embodiments of the present application include at least part of the following content.

Sidelink Communication Mode

With the development of sidelink communication technologies, the sidelink communication technologies relate to information exchange between various terminal devices. A V2X communications system 200 shown in FIG. 2 is used as an example, in which vehicle-to-vehicle (V2V) communication between a terminal device 201 and a terminal device 202 relates to information exchange between the vehicles. Vehicle-to-infrastructure (V2I) communication, vehicle-to-network (V2N) communication, and vehicle-to-pedestrian (V2P) communication respectively between the terminal device 201 and terminal devices 203 to 205 relate to information exchange between the vehicles and an external system.

Gradual expansion of an information exchange range imposes higher requirements on the communications system. For example, the communications system is required to support higher throughput, lower latency, higher reliability, larger coverage, more flexible resource allocation, and the like. Development of V2X is used as an example. In LTE-V2X, only a broadcast mode is supported between terminal devices for sidelink communication. In NR-V2X, three communication modes, namely, broadcast, groupcast, and unicast, may be supported.

Broadcast is the most basic communication mode in sidelink communication. For the transmission mode of broadcast, a terminal device that receives sidelink data may be any terminal device around a terminal device serving as a transmitting end. For example, with reference to FIG. 1, it is assumed that the terminal device 125 serves as a transmitting end and sends sidelink data in the broadcast mode. In this case, any one of the terminal devices 121 to 124 and the terminal devices 126 to 129 around the terminal device 125 may serve as a receiving end of the sidelink data.

Groupcast communication is used to support information exchange between terminal devices in a specific group (or referred to as a communication cluster), to assist in the negotiation, decision-making, and the like between terminal devices in the group. Sidelink groupcast is classified into two transmission types. Type 1 is for a managed group that has a stable connection relationship, and clear ID information and group member information. Type 2 is for a connectionless group formed in a connectionless manner, for example, is distance-based dynamically formed groupcast, which requires a communication distance that is clearly indicated for a current service.

For a transmission mode of groupcast, sidelink data may be received by all terminal devices in a communication cluster. Alternatively, the sidelink data may be received by all terminal devices within a specific transmission distance. For example, with reference to FIG. 1, for a communication cluster including the terminal devices 127 to 129, when the terminal device 127 sends sidelink data in a groupcast mode, all the other terminal devices 128 and 129 in the communication cluster are receiving terminals that receive the sidelink data. For another example, with reference to FIG. 1, it is assumed that terminal devices within a preset range include the terminal devices 127 to 129. In this case, when the terminal device 127 sends sidelink data in a groupcast mode, all the other terminal devices 128 and 129 within the preset range are receiving terminals that receive the sidelink data.

Unicast communication enables sidelink communication between two terminal devices. NR-V2X is used as an example. In this case, radio resource control (RRC) signalling based on a newly defined PC5 interface enables reliable communication between one terminal device and another.

For a transmission mode of unicast, there is usually only one terminal device that receives sidelink data. With reference to FIG. 1, the terminal device 121 and the terminal device 122 may communicate with each other in the transmission mode of unicast. For example, when the terminal device 121 performs sidelink communication with the terminal device 122, the terminal device 122 serves as a unique receiving device to receive sidelink data. The sidelink data may include a PSSCH and a PSCCH. Through demodulation, the terminal device 122 may obtain sidelink control information (SCI) related to sidelink transmission and scheduling. The SCI may be used to help the terminal device 122 receive and decode sidelink information.

Sidelink System Frame Structure

A slot structure in NR-V2X is used as an example. Frame structures of a sidelink system frame to which embodiments of the present application are applicable is described below with reference to FIG. 3 and FIG. 4. The system frame is a single slot including 14 time domain symbols. FIG. 3 shows a frame structure of a system frame that does not carry a PSFCH. FIG. 4 shows a frame structure of a system frame that carries a PSFCH.

SCI in FIG. 3 and FIG. 4 consists of two parts, namely, first-phase SCI-1 and second-phase SCI-2. The first-phase SCI-1 is transmitted on a PSCCH, and the second-phase SCI-2 is transmitted on a PSSCH.

With reference to FIG. 3, in time domain, the SCI-1 transmitted on the PSCCH occupies two or three sidelink symbols starting from the $2^{nd}$ sidelink symbol (for example, an orthogonal frequency division multiplexing (OFDM) symbol) of the system frame. Transmission of the PSCCH at a start location of the slot helps the PSCCH to be obtained by a terminal device as the receiving end in advance, so that the PSCCH is demodulated as early as possible. In frequency domain, the PSCCH may occupy a plurality of PRBs. Usually, to reduce the complexity of blind detection of the PSCCH by the terminal device, configuration of only one quantity of PSCCH symbols and quantity of PRBs is allowed in one resource pool.

Still with reference to FIG. 3, in time domain, the SCI-2 transmitted on the PSSCH also starts from the $2^{nd}$ sidelink symbol of the system frame and ends at the penultimate sidelink symbol of the system frame. In frequency domain, the PSSCH occupies a plurality of sub-channels of the system frame. A sub-channel may be understood as the specified smallest granularity of PSSCH resource allocation in NR-V2X. A sidelink resource pool may include M sub-channels. Each sub-channel may include $N_{SubCHsize}$ physical resource blocks (PRBs). A value of $N_{SubCHsize}$ may be 10, 12, 15, 20, 25, 50, 75, or 100.

Usually, the $1^{st}$ sidelink symbol in a slot is a repetition of the $2^{nd}$ sidelink symbol. When the terminal device receives the system frame, the $1^{st}$ sidelink symbol may be used as an automatic gain control (AGC) symbol. Data on the AGC symbol is usually not used for data demodulation. The last symbol in the slot is a guard gap symbol.

With reference to FIG. 4, when a PSFCH channel is carried in a slot, the penultimate sidelink symbol and the antepenultimate sidelink symbol in the system frame are used for PSFCH transmission. In addition, a GAP symbol needs to be reserved after each of the PSSCH and the PSFCH. A value range of a PSFCH resource preconfiguration period may be {1, 2, 4} slots.

It may be learned from FIG. 3 and FIG. 4 that the PSCCH and a part of a PSSCH associated with the PSCCH are transmitted on resources that are overlapping in time but non-overlapping in frequency, and the other part of the PSSCH and the PSCCH are transmitted on resources that are non-overlapping in time.

Sidelink Communication Spectrum

A spectrum used in a communications system includes a licensed spectrum and an unlicensed spectrum. An important expansion direction of the communications system to different fields is use of the unlicensed spectrum. For example, NR deployed on the unlicensed spectrum is referred to as NR-U.

Currently, a sidelink mainly uses a licensed spectrum. The sidelink may also use an unlicensed spectrum. A sidelink deployed on the unlicensed spectrum may be referred to as SL-U.

Compared with the licensed spectrum, the unlicensed spectrum has a feature of sharing without a license. Therefore, the unlicensed spectrum is also referred to as shared spectrum. For operators, spectrum sharing facilitates spectrum aggregation in a timely manner to dynamically support high-bandwidth services. Spectrum sharing can also extend benefits of communication technologies (such as NR) to an operating entity that may not have access to the licensed spectrum.

For the shared spectrum, coexistence of different radio access technology (RAT) systems needs to be considered, for example, typically a wireless fidelity (WiFi) system and an LTE-based licensed assisted access (LAA) system. Different systems use frequency bands in the unlicensed spectrum in a spectrum contention manner according to principles of channel access fairness and multi-RAT coexistence.

In the shared spectrum, any RAT system needs to perform communication under restrictions of unlicensed spectrum regulatory rules. The regulatory rules include power and power spectral density levels, a maximum channel occupancy time (COT), a channel occupancy bandwidth, a channel monitoring mechanism, and the like. In a same frequency band, each system needs to meet requirements of the regulatory rules, and reasonably occupy and release channels, without causing interference to another RAT system in the same frequency band.

For use of the shared spectrum, the RAT system may use a mandatory channel monitoring technology (such as LBT) to access a network. In other words, data can be transmitted only when it is detected that the current channel is not occupied. By using the channel monitoring technology, it can be ensured that the shared channel is unblocked before a terminal device transmits a signal on the shared channel. In other words, the terminal device on the sidelink may initiate LBT to obtain a channel resource of the shared spectrum. Optionally, the terminal device may determine by performing LBT whether a channel is unoccupied. If the LBT process passes, the terminal device starts to send data. For example, when obtaining the channel resource through LBT, the terminal device on the sidelink may perform corresponding detection and make preparations for sidelink data transmission.

LBT initiated by a terminal device on the shared spectrum may be type-1 LBT, or may be type-2 LBT. Type-2 LBT further includes three channel access manners: a type 2A, a type 2B, and a type 2C respectively. It is defined that different LBT types have corresponding lengths, to meet an adjustment requirement of the terminal device for initializing channel occupation and performing transmission on an occupied channel after a gap duration.

With reference to FIG. 1 to FIG. 4, the foregoing describes that there are many limitations when a sidelink is deployed in a shared spectrum. For example, there are a plurality of types of RATs for the shared spectrum. When only LBT is performed in SL-U, a terminal device cannot predict mutual interference in the system. As a result, conflicts caused due to faulty LBT may increase. For another example, a bandwidth of LBT is 20 MHz, which is much wider than a width of a sub-channel of a sidelink resource pool. Therefore, SL-U may support a plurality of terminal devices in simultaneously sending frequency division multiplexed (FDMed) signals on an LBT frequency band, to improve spectral efficiency. However, in the absence of a centralized scheduler, it is difficult to achieve this objective by performing only LBT. For another example, it is difficult to correctly process periodic transmission through LBT. However, periodic traffic in sidelink communication is a typical requirement. This may cause significant performance degradation.

For another example, a normal cyclic prefix (NCP) and an extended cyclic prefix (ECP) are defined in NR-U. The ECP may be applied to a 60 kHz subcarrier spacing (SCS). In this case, a terminal device can process a larger delay spread and tolerate a larger synchronization error by using a large cyclic prefix (CP) length. A propagation delay may cause a large synchronization error. For example, a length of an NCP of 60 kHz is 1.17 μs, and corresponds to a distance of 351 m. This distance is not sufficient to meet communication ranges of some applications (for example, NR V2X sometimes requires a 500 m/800 m/1000 m communication range). It should be noted that it is necessary for the CP to adapt to a channel delay spread. Therefore, an actual communication range is less than 351 m. The terminal device may rely on different numerology to support a larger communication range. For example, a 15 kHz SCS has an NCP of 4.7 μs. However, the ECP should support at least 60 kHz to support a larger sidelink communication range. Certainly, a terminal device that moves at a very high speed and whose delay requirement is very low is not a target instance of the foregoing NCP or ECP.

For another example, in NR-U, for a dynamic grant (DG) resource allocation manner, all resources used by a terminal device are scheduled by a network device without a conflict. For a configured grant (CG) resource allocation manner, a transmission conflict may occur when a terminal device performs uplink transmission on all RBs in a resource block (RB) set by using consecutive OFDM symbols. In NR-U, a transmission conflict is avoided by randomly selecting a channel access point. For SL-U, when a plurality of terminal devices perform channel monitoring on a resource of a shared spectrum, it is possible that a conflict between the plurality of terminal devices occurs at a channel access locations. In a related technology, for SL-U, an access point extension (CPE) may be supported, to provide a plurality of access points for the terminal device, thereby reducing conflicts.

However, when the shared resource is determined, how a terminal device that provides the shared resource configures a CPE and how to send CPE indication information to a terminal device are problems that need to be resolved.

To resolve some of the foregoing problems, an embodiment of the present application proposes a method for sidelink communication. In the method, a CPE is determined based on a subcarrier spacing. The CPE can be configured based on a time length of a symbol or a slot. Therefore, it is ensured that there are one or more CPEs in a symbol or a slot at which a terminal device performs channel access. These CPEs may be used for managing channel access locations of a plurality of terminal devices, to avoid an access conflict between the plurality of terminal devices. For ease of understanding, the method provided in this embodiment of the present application is described in detail below with reference to FIG. 5.

With reference to FIG. 5, in step S510, a first terminal device determines first configuration information of a first shared resource.

The first terminal device is any foregoing terminal device that performs sidelink communication. For example, the first terminal device may be a vehicle in V2X, or may be a pedestrian in V2X. For another example, the first terminal device may be a sending terminal of a sidelink, or may be a receiving terminal of a sidelink.

The first terminal device may be a communication device that needs to transmit data in sidelink communication. The first terminal device may perform unicast communication, groupcast communication, or broadcast communication with other terminal devices. In some embodiments, the first terminal device may be a cluster header that initiates groupcast or broadcast communication, or may be a cluster member in groupcast or broadcast communication. For example, in V2X, the first terminal device may be a vehicle that performs groupcast communication with other vehicles, or may be another vehicle in the groupcast communication.

In some embodiments, the first terminal device may be within coverage of a network, or may be outside coverage of a network. The first terminal device within the coverage of the network may perform channel monitoring on a shared spectrum based on configuration of a network device.

In some embodiments, the first terminal device may be a terminal device that provides COT sharing for a sidelink. For example, in V2X, the first terminal device may provide COT sharing for nearby vehicles, so that these vehicles perform channel access through channel monitoring. In some embodiments, the first terminal device may be a terminal device that performs channel monitoring for COT sharing to obtain a shared resource. For example, in V2X, the first terminal device may obtain a COT shared resource of a sidelink when LBT succeeds, to perform sidelink transmission.

The first shared resource is a time-frequency resource in a shared spectrum. The first shared resource may be a resource within COT sharing, or may be a resource outside COT sharing. In some embodiments, the first shared resource may be a time-frequency resource within a COT duration. In some embodiments, the first shared resource may be a time-frequency resource outside a COT duration.

In some embodiments, the first shared resource is a plurality of RB sets in the shared spectrum. For example, the first shared resource may include an RB resource reserved for a terminal device, so that the terminal device performs periodic sidelink transmission. For example, sidelink control information (SCI) for indicating the first shared resource may include resource reservation information. For example, the first shared resource may include some RB sets in a COT shared resource, or may include all RB sets in a COT shared resource.

In some embodiments, the first shared resource may be used by the first terminal device or another terminal device to send a sidelink channel. The sidelink channel sent by the terminal device may be a PSSCH, or may be a PSCCH. This is not limited herein.

That the first terminal device determines the first configuration information of the first shared resource indicates that the first terminal device may determine the first configuration information in a configuration manner, or may determine the first configuration information by receiving information. In some embodiments, when the first terminal device is a terminal device that provides the first shared resource, the first configuration information may be directly determined. In some embodiments, when the first terminal device is a terminal device that sends the sidelink channel by using the first shared resource, the first configuration information may be determined based on COT shared information (SI) of the first shared resource.

The first configuration information may include CPE indication information. In some embodiments, the CPE indication information may be included in the COT shared information. In other words, the COT shared information may indicate a CPE configuration manner and a CPE configuration parameter by using the first configuration information.

In some embodiments, the first configuration information may be carried in SCI information sent by the first terminal device. The first terminal device may send the SCI information on a shared spectrum. For example, when the COT shared information is carried in the SCI information, the first configuration information may follow the COT shared information to be carried in the SCI information. For example, in addition to original identity (ID) information and destination ID information of COT sharing and groupcast ID information, the SCI information may further include the first configuration information indicating a CPE. For example, the first configuration information may be independently carried in the SCI information. For example, the SCI information may include ID information of a CPE group.

FIG. 3 or FIG. 4 is used as an example. The first configuration information may be carried in a first sidelink channel including first-phase SCI (SCI-1) and second-phase SCI (SCI-2). The first sidelink channel may include a PSSCH and a PSCCH. Specifically, the first configuration information may be carried in the first-phase SCI and/or the second-phase SCI. In other words, the first configuration information may appear separately or together in the two phases of SCI.

The first configuration information may indicate one or more CPEs corresponding to the first shared resource. A CPE corresponding to the first shared resource indicates that a terminal device can access the first shared resource by using the CPE. In other words, the CPE may be used by the terminal device to determine a time domain location for accessing the first shared resource.

In some embodiments, the first shared resource may correspond to one CPE. In other words, a quantity of time domain locations of the CPE for accessing the first shared resource by the terminal device in the first configuration information is set to 1. In some embodiments, the first shared resource may correspond to a plurality of CPEs. The plurality of CPEs may be used by a plurality of terminal devices to access the first shared resource.

The one or more CPEs may be determined based on a subcarrier spacing corresponding to the first shared resource. In some embodiments, a time domain resource in which the one or more CPEs are located may be determined based on the subcarrier spacing. In some embodiments, a quantity of CPEs may be determined based on the subcarrier spacing. In some embodiments, a time domain location corresponding to the one or more CPEs may further be determined based on the subcarrier spacing and another parameter.

The time domain resource in which the one or more CPEs are located indicates a time domain resource for configuring the CPE. In some embodiments, the time domain resource for configuring the CPE may be a GAP symbol in a slot structure. Because data transmission is not performed in the GAP symbol, the GAP symbol may be used to configure the one or more CPEs. In some embodiments, the time domain resource for configuring the CPE may be one or more symbols before a next AGC symbol for the subcarrier spacing. Usually, data transmission is not performed at a symbol before the AGC symbol.

In some embodiments, the time domain resource in which the one or more CPEs are located may be one symbol, or may be two consecutive symbols. For example, the time domain resource in which the one or more CPEs are located may be one GAP symbol.

In some embodiments, the time domain resource in which the one or more CPEs are located may be determined based on one or more of the following information: the subcarrier spacing; a duration of the first shared resource; and whether the first shared resource includes a reserved resource.

For example, for a 15 kHz subcarrier spacing, time domain location(s) of the one or more CPEs may be set in a symbol before a next AGC symbol corresponding to the subcarrier spacing. For example, for 30 kHz and 60 kHz subcarrier spacings, the time domain location(s) of the one or more CPEs may be set in at most two symbols before a next AGC symbol corresponding to the subcarrier spacing.

For example, the duration of the first shared resource may be a COT duration. Based on the COT duration, there may be resource conflicts between a plurality of different terminal devices. Specifically, the terminal device may need enough time to receive/decode the COT shared information and prepare for sidelink transmission. Within the COT duration, the time domain location(s) of the one or more CPEs may be set in at most two symbols before a next AGC symbol. Outside the COT duration, the time domain location (s) of the one or more CPEs may be set in at most one symbol before a next AGC symbol.

For example, the first shared resource is an RB resource. If the RB resource includes reserved resource, the time domain location(s) of the one or more CPEs may be set in the at most two symbols before the next AGC symbol; or if the RB resource includes no reserved resource, the time domain location(s) of the one or more CPEs may be set in the at most one symbol before the next AGC symbol. Alternatively, otherwise, if the RB resource includes reserved resource, the time domain location(s) of the one or more CPEs may be set in the at most one symbol before the next AGC symbol; or if the RB resource includes no reserved resource, the time domain location(s) of the one or more CPEs may be set in the at most two symbols before the next AGC symbol.

In some embodiments, the subcarrier spacing may further be used to determine a quantity of CPEs. Different subcarrier spacings correspond to different time lengths of a time unit. The time unit may be a slot, or may be a symbol. This is not limited herein. A larger subcarrier spacing indicates a shorter actual time length of a slot. For a time unit for configuring the CPE, different configurations may be performed for different subcarrier spacings. For example, different CPE configuration values may be respectively set for 15 kHz, 30 kHz, 60 kHz, 120 kHz, and other subcarrier spacings. The CPE configuration value may include a quantity of CPEs and time domain locations of the CPEs.

For example, for 15 kHz and 30 kHz subcarrier spacings, if one symbol is used to configure a CPE, two CPEs may be (pre)configured or predefined; or if two symbols are used to configure a CPE, seven CPEs may be (pre)configured or predefined.

For example, for a 60 kHz subcarrier spacing, if one symbol is used to configure a CPE, only one CPE can be (pre)configured or predefined; or if two symbols are used to configure a CPE, four CPEs may be (pre)configured or predefined.

In some embodiments, one or more time domain locations corresponding to the one or more CPEs may be determined based on both the subcarrier spacing and other information. The time domain location corresponding to the CPE indicates a time domain location at which a terminal device can perform channel access. The time domain location corresponding to the CPE may also be referred to as a CPE start location or a CPE candidate location.

In a possible implementation, the one or more time domain locations corresponding to the one or more CPEs may be determined based on a first time interval. The first time interval may be one or more microseconds (μs). For example, a time length of the first time interval may include one or more of the following: 9 μs, 16 μs, and 25 μs. In other words, when it is determined that one or two symbols are used to configure a CPE, a location set may be formed in the symbol for a plurality of CPEs. The location set may be access location groups respectively based on intervals of 9 μs, 16 μs, and 25 μs.

For example, the first time interval may be one of the following time intervals: a time interval between the 1st CPE in the one or more CPEs and a start location of the time domain resource in which a CPE is located; a time interval between two adjacent CPEs in the one or more CPEs; and a time interval for determining the one or more time domain locations of the one or more CPEs. It should be noted that CPE configuration may require different first time intervals. Different first time intervals may be different types of first time intervals, or may be first time intervals with different time lengths.

Optionally, when the first time interval is the time interval between the 1st CPE and the start location of the time domain resource in which a CPE is located, the first time interval may be used to determine a time domain location of the 1st CPE. As shown in FIG. 6, time domain locations corresponding to different CPEs may be determined based on different time intervals. With reference to FIG. 6, two CPEs are configured in a GAP symbol (sym #13) of a slot 610, and an AGC symbol after the GAP symbol is the 1st symbol of a slot 620. A CPE corresponding to a first time interval of 16 μs is a CPE 632, and a CPE corresponding to a first time interval of 25 μs is a CPE 634.

Optionally, when the first time interval is the time interval between two adjacent CPEs, the first time interval may be used to determine time domain locations of a plurality of CPEs. For example, when the first time interval is 16 μs, the time domain locations of the plurality of CPEs may be determined based on a time domain location of the 1st CPE and the time interval of 16 μs.

Optionally, when the first time interval is the time interval for determining the time domain location(s) of the one or more CPEs, the first time interval may be used to determine to group a plurality of CPEs, or may be used to determine time domain locations of a plurality of CPEs in a specific location group. For example, CPEs with the same time interval may be in one CPE group. For another example, when a CPE group includes location groups corresponding to the two first time intervals of 9 μs and 16 μs, time domain locations of a plurality of CPEs in the CPE group may be separately determined based on 9 μs and 16 μs.

For example, a time domain location of any one of the one or more CPEs may meet the following condition:

$$\{T_{sym}+\delta T\}.$$

Herein, $T_{sym}$ is the start location of the time domain resource in which the one or more CPEs are located, and $\delta T$ is a second time interval between any CPE and the start location of the time domain resource. The second time interval may include one or more first time intervals described above, or may be another time interval.

In another possible implementation, the time domain location(s) corresponding to the one or more CPEs may also be determined based on a location of a PSCCH/PSSCH transmission resource. For example, for transmission within a COT and transmission outside the COT, a group of CPEs may be separately (pre)configured or predefined based on the subcarrier spacing.

The foregoing describes the quantity and the time domain locations of CPEs that are determined based on the subcarrier spacing. For ease of understanding, possible configuration manners of CPEs in cases of different subcarrier spacings are described below respectively with reference to FIG. 7 to FIG. 9.

With reference to FIG. 7, for 15 kHz and 30 kHz subcarrier spacings, a time domain resource used to configure CPEs is one symbol. The one symbol is a symbol 13 (sym #13) in a current slot. A symbol 12 (sym #12) before the symbol 13 is used to transmit a PSSCH or a PSCCH. A symbol 0 (sym #0) after the symbol 13 is used to transmit AGC for a next slot. Time domain locations of two CPEs, a CPE 702 (index #0) and a CPE 704 (index #1) respectively, may be configured in the symbol 13.

As shown in FIG. 7, a first time interval is a time interval between a CPE and a start location of a time domain resource. A first time interval corresponding to the CPE 702 is 16 μs. A first time interval corresponding to the CPE 704 is 25 μs.

The time domain locations of the two CPEs in FIG. 7 may be represented as $\{T_{sym}+16\ \mu s, T_{sym}+25\ \mu s\}$. Certainly, one CPE may be (pre)configured or predefined in the symbol 13. The CPE may be $\{T_{sym}+16\ \mu s\}$ or $\{T_{sym}+25\ \mu s\}$.

With reference to FIG. 8, for a 60 kHz subcarrier spacing, a time domain resource used to configure CPEs is one symbol. The symbol is the same as that in FIG. 7. Details are not described again. A time domain location of only one CPE, namely, a CPE 802 (index #0) can be configured in the symbol 13.

As shown in FIG. 8, a first time interval is a time interval between a CPE and a start location of a time domain resource. In the example of FIG. 8, a first time interval corresponding to the CPE 802 is 16 μs. Therefore, a time domain location of the CPE 802 may be represented as $\{T_{sym}+16\ \mu s\}$.

Figures 9, 10, 11, 12:
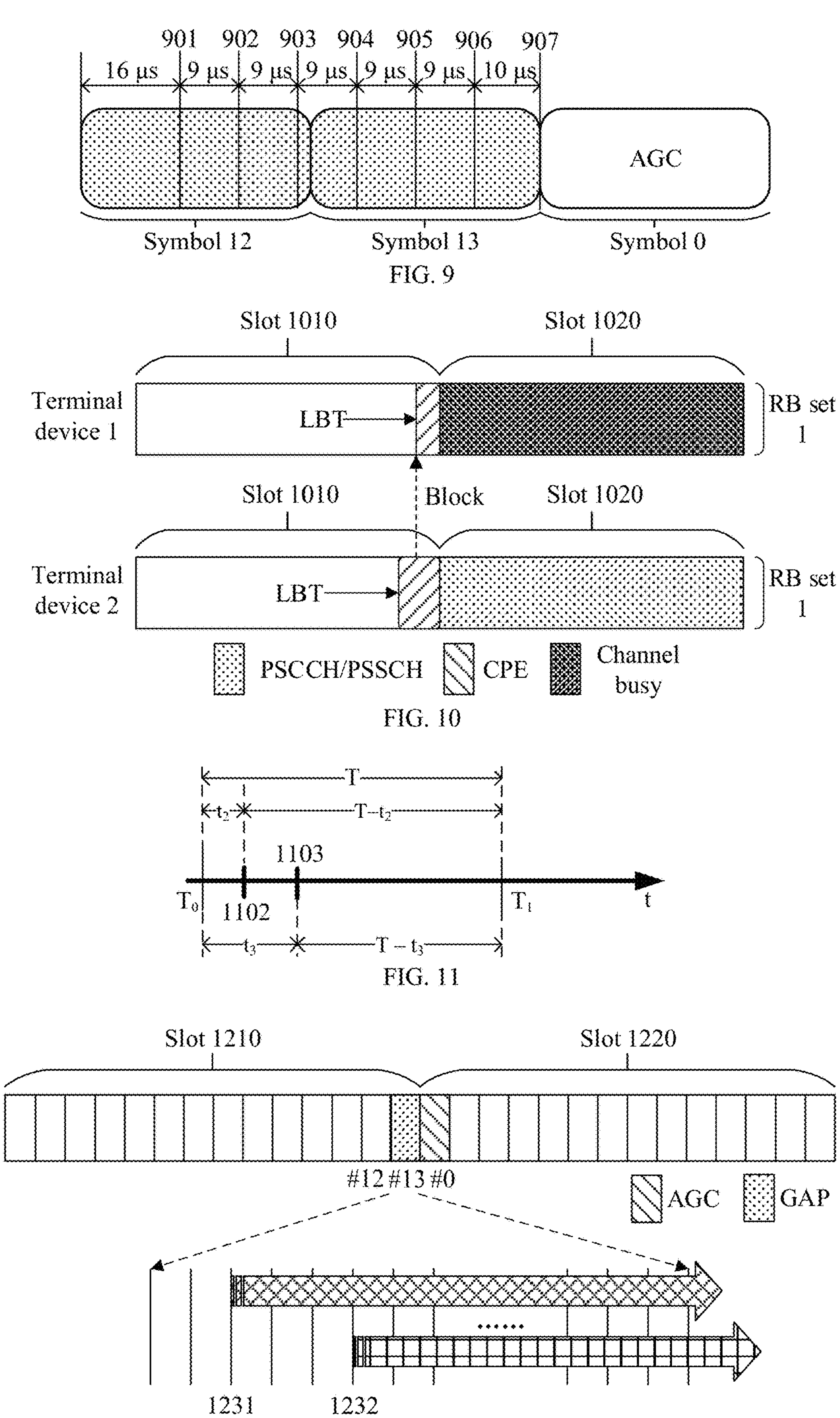
FIG. 9 is a schematic diagram of yet another possible implementation of CPE configuration.
FIG. 10 is a schematic diagram in which a terminal device with a high priority is blocked by a terminal device with a low priority.
FIG. 11 is a schematic diagram in which a plurality of terminal devices request for channel access.
FIG. 12 is a schematic diagram of a possible implementation of a method according to an embodiment of the present application.

With reference to FIG. 9, for 15 kHz and 30 kHz subcarrier spacings, a time domain resource used to configure CPEs is two symbols. The two symbols are respectively a symbol 12 (sym #12) and a symbol 13 (sym #13) in a current slot. A symbol 0 (sym #0) after the symbol 13 is an AGC symbol in a next slot. Time domain locations of seven CPEs, a CPE 901 (index #0) to a CPE 907 (index #6) respectively, may be configured in the symbol 12 and the symbol 13.

As shown in FIG. 9, when a first time interval is a time interval between a CPE and a start location of a time domain resource, the first time interval is 16 μs. When the first time interval is a time interval between two adjacent CPEs, the first time interval is 9 μs. Because time lengths of the two symbols are limited, a time interval between final two CPEs is determined according to an actual case.

Time domain locations of the seven CPEs in FIG. 9 may be represented as {$T_{sym}$+16 μs, $T_{sym}$+25 μs, $T_{sym}$+34 μs, $T_{sym}$+43 μs, $T_{sym}$+52 μs, $T_{sym}$+61 μs, 0}.

For a 60 kHz subcarrier spacing, when a time domain resource used to configure CPEs is two symbols, time domain locations of only four CPEs can be (pre)configured or predefined in the two symbols. Only the four CPEs are configured in the two symbols to ensure the time interval between adjacent CPEs to meet an LBT access requirement and reduce access interference. The time domain locations of the four CPEs in the two symbols may be represented as {$T_{sym}$+16 μs, $T_{sym}$+25 μs, $T_{sym}$+34 μs, 0}.

Still with reference to FIG. 5, the first configuration information may include a configuration parameter of the one or more CPEs determined based on the subcarrier spacing, or may include other parameter information of the one or more CPEs. Specifically, the first configuration information may indicate a time domain resource in which the one or more CPEs are located, a quantity of the one or more CPEs, and one or more time domain locations corresponding to the one or more CPEs. Alternatively, the first configuration information may further include a grouping status of the one or more CPEs. Alternatively, the first configuration information may indicate an index (index) of the one or more CPEs, which may be used by a plurality of terminal devices to select CPEs.

In some embodiments, the first configuration information may further indicate one or more CPE groups. The one or more CPE groups may indicate a location group of CPEs in the time domain resource. One of the one or more CPE groups may include one or more CPEs. A plurality of CPE groups in the one or more CPE groups each may include one or more CPEs.

In a possible implementation, the one or more CPE groups may be determined based on a plurality of types of information. In other words, a plurality of CPEs may be grouped based on a plurality of types of information to determine the one or more CPE groups. Information used for grouping may include: priorities associated with the CPEs; time intervals corresponding to the plurality of CPEs; and whether the CPEs are CPEs corresponding to resource reservation information.

Optionally, the CPEs associated with different priorities may be divided into different CPE groups.

Optionally, CPEs with the same time interval may be set to one CPE group.

Optionally, if the first shared resource includes a reserved resource, CPEs corresponding to the same or different resource reservation information may be set to one CPE group.

In a possible implementation, the first configuration information may further indicate the configuration parameter of the one or more CPE groups. The configuration parameter is a configuration value of a CPE group. The configuration parameter of the CPE group may include one or more of the following: a time domain resource in which the CPE group is located; a time domain location corresponding to the CPE group; a time domain location corresponding to each CPE in the CPE group; one or more start time domain locations corresponding to the CPE group; one or more first time intervals of the CPE group; and ID information of the CPE group.

For example, the time domain resource in which the CPE group is located, the time domain location corresponding to the CPE group, and the time domain location corresponding to each CPE are the same as the configuration parameter of the one or more CPEs above. Details are not described herein again.

For example, the CPE group may correspond to one start time domain location. Start time domain locations (pre) configured/predefined for different CPE groups may be the same or may be different.

For example, the CPE group may correspond to a plurality of start time domain locations. The CPE group may correspond to a plurality of first time intervals to correspond to the plurality of start time domain locations. For example, when time domain locations of a plurality of CPEs are determined for the CPE group based on 16 μs and 25 μs, the time domain locations of the two CPEs shown in FIG. 6 or FIG. 7 may be separately determined based on 16 μs and 25 μs. The two CPEs may be respectively the $1^{st}$ CPEs of two access location groups.

For example, the one or more first time intervals of the CPE group may be any one or more of the foregoing described first time intervals. Details are not described herein again.

For example, the ID information of the CPE group may indicate a plurality of CPE groups, so that a terminal device selects an appropriate CPE group or CPE to access the first shared resource.

The terminal device that accesses the first shared resource is a second terminal device. In some embodiments, the second terminal device may be the first terminal device. For example, when the first terminal device is a terminal device that sends a sidelink channel by using the first shared resource, the second terminal device is the first terminal device. In some embodiments, the second terminal device is a terminal device other than the first terminal device on a sidelink. For example, when the first terminal device shares the first shared resource, the second terminal device is another terminal device that requests to access the first shared resource on the sidelink.

The one or more CPEs may be used by the second terminal device to determine a time domain location for accessing the first shared resource. Based on a configured CPE, the access location of the second terminal device may be managed, to avoid an access conflict between a plurality of terminal devices. In some embodiments, when the first shared resource corresponds to one CPE, the second terminal device may perform channel access at a time domain location of the CPE. In some embodiments, when the first shared resource corresponds to a plurality of CPEs, the second terminal device may select one CPE from the plurality of CPEs, and perform channel access at a time domain location of the CPE.

In some embodiments, when the first configuration information indicates the plurality of CPEs, a plurality of second terminal devices may perform channel access respectively by using time domain locations corresponding to the plurality of CPEs, which helps avoid a conflict between the plurality of terminal devices.

The first configuration information may support a plurality of CPE configuration forms. For example, the first configuration information may support CPE static configuration by using configuration values of a plurality of CPEs or CPE groups. For another example, the first configuration information may support CPE semi-static configuration by using configuration values of a plurality of CPEs or CPE groups.

For example, for CPE static configuration, a plurality of CPE configuration values may be (pre)configured. These configuration values may relate to a quantity of symbols and a candidate location of an associated CPE, that is, a time domain resource in which a CPE is located and a time domain location corresponding to a CPE, for example, one symbol or two symbols.

Optionally, CPE group static configuration is supported, so that a plurality of CPE group configuration values can be (pre)configured. The configuration values may relate to a quantity of symbols, a candidate location of a CPE group, a candidate location of each CPE in the CPE group, and whether a start candidate location of each CPE group includes one or more start locations. In other words, the configuration value of the CPE group may indicate one or more of the following information: a time domain resource in which a CPE group is located; a time domain location of a CPE group; a time domain location corresponding to each CPE in a CPE group; and one or more start time domain locations corresponding to a CPE group.

Optionally, CPE static configuration is supported, so that a plurality of CPE configuration values and a relationship between a CPE configuration value and a priority can be (pre)configured. The priority may include a channel access priority class (CAPC), a service priority, or a priority class after a service priority matches a CAPC.

For example, for CPE semi-static configuration, a plurality of CPE configuration values may be (pre)configured. Configuration values may be respectively set for 15 kHz, 30 kHz, and 60 kHz subcarrier spacings. Further, semi-static configuration may support a terminal device in selecting a time domain location for channel access according to a specified rule. Optionally, the terminal device may select a candidate location randomly. The random selection may be completely random, or may be determined based on a hash function.

Optionally, the terminal device may select a candidate location based on a service characteristic or a priority setting of the terminal device. In other words, the first configuration information is used to perform semi-static configuration on the one or more CPEs. The semi-static configuration is used to instruct the second terminal device to determine the CPE for performing channel access, based on one or more of the following information: random access, a hash function, a service characteristic of the second terminal device, and a priority corresponding to the second terminal device.

Optionally, CPE group semi-static configuration is supported, so that a plurality of CPE group configuration values can be (pre)configured. The CPE group configuration values may include a plurality of candidate locations of a CPE group, a candidate location of each CPE in a CPE group, and whether a start candidate location of each CPE group includes one or more start locations. For example, the CPE group may be a CPE group with a time interval of 9 μs or a multiple of 9 μs, or may be a group with a time interval of 25 μs or a multiple of 25 μs, or may be a group with a time interval of 16 μs or a multiple of 16 μs. For another example, the CPE group may be a CPE group configured in a manner of mixing three time intervals: 9 μs, 16 μs, and 25 μs.

It may be learned from FIG. 5 to FIG. 9 that the one or more CPEs corresponding to the first shared resource are determined based on the subcarrier spacing, so that a plurality of terminal devices can select access points in a time unit for performing channel access. In other words, in SL-U, a PSSCH or a PSCCH may support a plurality of time domain locations of CPEs. When the plurality of time domain locations of the CPEs are (pre)configured for PSCCH/PSSCH sidelink transmission, a second terminal device that sends the sidelink channel needs to select one CPE for performing channel access. If the second terminal device randomly selects one time domain location of a CPE for performing channel access, or does not consider a priority when selecting the CPE, a service with a high priority may be blocked by a service with a low priority, thereby lowering transmission performance.

For ease of understanding, an example of this case is described below with reference to FIG. 10. With reference to FIG. 10, both a terminal device 1 and a terminal device 2 perform LBT in a slot 1010 in an RB set 1. A priority of the terminal device 1 is 1, and a priority of the terminal device 2 is 3. In other words, the priority of the terminal device 1 is higher than the priority of the terminal device 2.

As shown in FIG. 10, after LBT counters reach 0, the two terminal devices perform channel access based on selected CPEs. When the LBT counters of the two terminal devices fall back to 0 in the slot 1010, LBT of the terminal device 2 succeeds, and LBT of the terminal device 1 fails, because a time domain location of a CPE randomly selected by the terminal device 2 is earlier than that of a CPE randomly selected by the terminal device 1. For the terminal device 2, a slot 1020 may be used by the terminal device 2 to transmit a PSCCH or a PSSCH. For the terminal device 1, a state of the slot 1020 is channel busy and unaccessible. Therefore, the terminal device 1 with a high transmission priority is blocked by the terminal device 2 with a low priority.

To resolve this problem, a priority corresponding to a terminal device or a to-be-transmitted channel may be considered when the terminal device selects a CPE. As mentioned above, the one or more CPEs in static configuration or semi-static configuration may be associated with a priority. For example, one or more CPE time domain locations may be configured based on a transmission priority of a PSCCH/PSSCH. However, how the terminal device selects a CPE based on a priority associated with a CPE also needs to be resolved.

An embodiment of the present application further provides a method for sidelink communication. In this method, a terminal device with a higher priority may select a CPE with an earlier time domain location, to avoid a case in which a terminal device with a high priority is blocked by a terminal device with a low priority.

It may be learned from the foregoing that a first shared resource may be used by a second terminal device to send a sidelink channel. A terminal device that shares the first shared resource may (pre)configure or predefine one or more CPEs for a plurality of second terminal devices.

In some embodiments, the terminal device that shares the first shared resource may configure a time domain location of a default CPE based on resource reservation information. The default CPE may be a first CPE, or may be a first CPE group. The following is specifically described with reference to an explanation of resource reservation information.

In some embodiments, the terminal device that shares the first shared resource may preconfigure a time domain location of the one or more CPEs, or may dynamically configure a time domain location of the one or more CPEs.

The one or more CPEs configured by the terminal device may be associated with a priority, so that transmission can be earlier performed for a service or a terminal device with a high priority. Specifically, to perform sidelink transmission, the second terminal device may select a CPE based on the priority associated with the one or more CPEs in the first configuration information. In other words, the second terminal device may determine, based on the priority associated with the one or more CPEs, the CPE for performing channel access.

In some embodiments, the priority associated with the one or more CPEs may be a priority of quality of service (QoS). For example, the first shared resource is used by the second terminal device to send a sidelink channel such as a PSCCH/PSSCH. A priority corresponding to the sidelink channel may be used to select a CPE for performing channel access.

In some embodiments, the priority associated with the one or more CPEs may be a channel access priority. The channel access priority may be indicated by a CAPC. For example, a CPE with a later time domain location may be selected for transmission with a lower CAPC, and a CPE with an earlier time domain location may be selected for transmission with a higher CAPC.

In some embodiments, the priority associated with the one or more CPEs may be a priority obtained after a service priority matches the channel access priority. For example, different data packet QoS identities (PQI) indicated by QoS may be separately mapped to three CAPC classes (class 1 to class 3). The following is an example.

PQI 90/91/92/93/21/22/23/55/56/57/58 and PQI 24/26/60 may be mapped to CAPC priority class 1 (mapping PQI 90/91/92/93/21/22/23/55/56/57/58 to CAPC priority class 1; mapping PQI 24/26/60 to CAPC priority class 1).

PQI 59/61 may be mapped to CAPC priority class 3 (mapping PQI 59/61 to CAPC priority class 3).

PQI 25 may be mapped to CAPC priority class 2 (mapping PQI 25 to CAPC priority class 2).

Optionally, when the one or more CPE time domain locations are configured based on the transmission priority of the PSCCH/PSSCH, a time domain location of a CPE may be selected in a predefined and/or specified manner, and the predefining and/or specifying may be carried in SCI information.

Optionally, when the one or more CPE time domain locations are configured based on the transmission priority of the PSCCH/PSSCH, selection of a sequence of the time domain locations may be determined based on a service priority or a CAPC, or may be determined based on a combination of a service priority and a CAPC. For example, a high priority corresponds to an earlier time domain location, and a low priority corresponds to a later time domain location.

A plurality of terminal devices may select CPEs based on foregoing priorities. Optionally, in resource allocation of a part or all of an RB set, based on the one or more CPE time domain locations configured based on the transmission priority of the PSCCH/PSSCH, a terminal device may select, by using a hash function, a CPE for performing channel access. For example, a CAPC value associated with the CPE may be used as one of criteria for selecting the CPE by the terminal device.

It should be noted that if a quantity of terminal devices that request for access within a period of time is less than or equal to a quantity of CPEs, it can be ensured that each terminal device can select a CPE. However, if the quantity of terminal devices that request for access within the period of time is greater than the quantity of CPEs, it cannot be ensured that a CPE can be allocated to each terminal device. In this case, the one or more CPEs can satisfy only a terminal device with a higher service priority corresponding to to-be-transmitted data, or a terminal device that performs channel access can be determined according to a principle of first coming first access. When determining is performed based on the priority, it may take a terminal device with a low priority a long time to be allocated to an access point for performing channel access. When determining is performed according to first coming first access, access of an emergency service or a high-priority service in a subsequent time t cannot be ensured, where t may be at a millisecond or microsecond level.

To more reasonably allocate the CPEs to the plurality of terminal devices, the first terminal device that shares the resource may evaluate a plurality of terminal devices that attempt to access within a period of time, to allocate the limited CPEs to terminal devices in need more urgently.

In some embodiments, the first terminal device that shares the resource may set a timing apparatus, for example, a timer T1. When a terminal device requests for access, the first terminal device may not first perform allocation for a terminal device that earliest performs access, but start the timing apparatus. During running of the timing apparatus, a plurality of terminal devices may request for access. When the timing apparatus reaches a timing point, the first terminal device may allocate, based on a quantity of CPEs, CPEs to a part or all of the plurality of terminal devices that request for access.

A time length set for the timing apparatus is a first time period. For example, the first time period is a duration of the T1 timer. The first time period may be a part or all of the foregoing period of time. This is not limited herein.

When a quantity of terminal devices that perform channel access in the first time period is greater than the quantity of the one or more CPEs, it may be determined, based on one or more pieces of information, which terminal devices may perform channel access by using these CPEs. For example, if the first configuration information indicates M CPEs, there are N terminal devices that request for channel access by using the M CPEs in the first time period. Both M and N are natural numbers greater than 0. When N>M, a terminal device that accesses a first shared resource by using the M CPEs in the N terminal devices may be determined based on one or more pieces of information.

In some embodiments, the one or more pieces of information used to determine the terminal device that can perform access in the N terminal devices may include: a time period in which the N terminal devices wait for access; the earliest time point at which the N terminal devices initiate an access request; and a service priority corresponding to to-be-transmitted data of the N terminal devices.

Optionally, a time period in which the N terminal devices wait for access may be a time period from a time point at which an LBT counter of a specific terminal device in the N terminal devices is 0, to a time point at which the terminal device can perform channel access. Different access waiting time periods may also indicate a sequence in which the N terminal devices request for access.

Optionally, the earliest time point at which the N terminal devices initiate an access request may be a time point at which the earliest LBT counter in the N terminal devices to become 0 in the first time period, that is, a time point at which a terminal device that first performs channel access initiates the access request in the first time period.

Optionally, when the first terminal device provides the first shared resource, the time period in which the N terminal devices wait for access may be related to the duration of a timer started by the first terminal device. For example, the timer is started in response to an access request of a terminal device that earliest performs channel access in the N terminal devices. The timer may be used by the first terminal device to determine a quantity of terminal devices that initiate access requests in the first time period, that is, a value of N.

Optionally, a service priority corresponding to to-be-transmitted data of the second terminal device may be a service priority of a to-be-transmitted sidelink channel, may be a CAPC corresponding to a to-be-transmitted sidelink channel, or may be a CAPC determined based on the service priority. When determining is performed based on the priority, access of the second terminal device with a relatively high priority can be ensured.

Optionally, when a quantity of terminal devices that request for access within a specific time period is greater than a quantity of CPEs, the foregoing three pieces of information may be all considered. In other words, three factors such as a waiting time period, a time point of the earliest access request, and a priority may be all considered, to determine whether a terminal device corresponding to the three factors can perform access.

Optionally, a first parameter of each of the N terminal devices may be determined based on some or all of the foregoing factors. The first parameter may be used to determine whether the corresponding terminal device can access the first shared resource by using the M CPEs.

The following describes an example of a possible calculation manner of the first parameter with reference to a schematic diagram in which a plurality of terminal devices perform channel access in FIG. 11.

With reference to FIG. 11, on a timeline, $T_0$ may represent the earliest time point at which the N terminal devices initiate the access request. A timer is started at $T_0$. A set time of the timer is reached at $T_1$. Therefore, T represents a duration of the timer, that is, the first time period. Herein, $T=T_1-T_0$.

Still with reference to FIG. 11, a time point 1102 and a time point 1103 respectively indicate time points at which the $2^{nd}$ terminal device and the $3^{rd}$ terminal device arrive (time points at which access requests are initiated). $T_0$ is used as a reference point. In this case, $t_2$ and $t_3$ may respectively represent a time period from the time point 1102 to $T_0$ and a time period from the time point 1103 to $T_0$. In other words, $T-t_2$ and $T-t_3$ respectively represent a time in which the $2^{nd}$ terminal device waits for access and a time in which the $3^{rd}$ terminal device waits for access.

On this basis, $T_0$ is used as the reference point, $t_i$ represents a time period from $T_0$ to a time point at which a terminal device i requests for access, and $T-t_i$ is a time in which the terminal device i waits for access. Herein, i is a natural number from 0 to N−1.

Further, a service priority of the terminal device i is set to $Q_i$, and a value of $Q_i$ is set to [1, 2, 3, 4, . . . , K]. In other words, $Q_i$ is a natural number from 1 to K, and K>1. Herein, 1 represents the highest priority. The priority class sequentially degrades. K represents the lowest priority. $Q_i$ may also be replaced with PQI.

To comprehensively consider a sequence and priorities of access of a plurality of terminal devices, a first parameter of the terminal device i in the N terminal devices may be represented as follows:

$$\frac{\alpha \times t_i}{T} + \frac{\beta \times Q_i}{K}.$$

Herein, T represents the first time period, α and β represent weight factors, α+β=1, and both α and β are rational numbers greater than or equal to 0. The first terminal device may adjust the weight factors according to specific implementations and scenarios. Meanings of other letters are described above.

For example, when N>M, a terminal device that accesses the first shared resource by using the M CPEs in the N terminal devices may be determined through comparison of the first parameter. For example, the first parameter of the terminal device that can access the first shared resource by using the M CPEs in the N terminal devices meets a following condition:

$$\min\left(\frac{\alpha \times t_i}{T} + \frac{\beta \times Q_i}{K}\right).$$

Herein, min( ) represents a process of taking a minimum value.

Specifically, a terminal device with the smallest first parameter in the N terminal devices may be successively selected according to the foregoing formula. Specifically, the terminal device with the smallest first parameter is first selected from the N terminal devices, then a terminal device that has the smallest first parameter in the remaining N−1 terminal devices is selected, and the selection is continuously performed until M terminal devices that can perform channel access by using the M CPEs are selected.

In a specific embodiment, when one preconfigured CPE is set, if several terminal devices attempt to access, a terminal device that uses the CPE may be determined based on a service priority mapping to a channel priority. Specifically, when LBT counters of the plurality of terminal devices successively fall back to 0, the terminal device that shares the resource may start the T1 timer based on a terminal device that performs access first. When the T1 timer reaches the set first time period, priorities of several terminal devices may be compared. In a sequence from class 1 to class 3, access of a terminal device in class 1 is first ensured.

In another specific embodiment, when M preconfigured CPEs are set, if N (greater than M) terminal devices initiate channel access requests in the first time period, a terminal device that can perform channel access by using the indicated M CPEs may be determined based on the foregoing first parameters corresponding to the N terminal devices. For example, the first parameters of the N terminal devices are arranged in ascending order, and terminal devices corresponding to the first M first parameters may access the first shared resource by using the M CPEs.

In another specific embodiment, when one preconfigured CPE is set, if N (greater than 1) terminal devices initiate channel access requests in the first time period, the first parameter of the terminal device that can access the first shared resource by using the CPE meets a following condition:

$$\min\left(\frac{\alpha \times t_i}{T} + \frac{\beta \times Q_i}{K}\right).$$

In another specific embodiment, when one preconfigured CPE is set, if a plurality of terminal devices attempt to access, the first terminal device that shares the resource may set the timer T1. Further, the first terminal device may consider three factors: the access sequence of the plurality of terminal devices (waiting times δ of the plurality of terminal devices), the duration of the T1 timer, and a priority, to determine a terminal device that can perform access. In other words, if several terminal devices attempt to access, when LBT counters of these terminal devices fall back to 0 in a slot n, the T1 timer is started based on a time at which the earliest LBT counter falls back to 0. After the T1 timer reaches a specified time, priorities and waiting times δ of the several terminal devices are compared, to determine a terminal device that can perform channel access by using the CPE. For example, according to $$\min\left(\frac{\alpha \times t_i}{T} + \frac{\beta \times Q_i}{K}\right),$$

a terminal device that can perform channel access may be selected based on parameters corresponding to a plurality of terminal devices that attempt to access.

It may be learned from the foregoing that access of the plurality of terminal devices may be managed based on the one or more configured CPEs. For example, when a quantity of terminal devices that perform access is greater than a quantity of CPEs, a terminal device with a higher service priority or a longer waiting time is preferentially considered. FIG. 12 is a schematic diagram of a possible implementation according to an embodiment of the present application.

With reference to FIG. 12, a time domain resource used for configuring a CPE is the last symbol (#13) of a slot 1210. A plurality of CPEs are set in the symbol 13 based on a specific time interval.

In FIG. 12, a CPE 1231 is a transmission start point of a terminal device 1, and a CPE 1232 is a transmission start point of a terminal device 2.

As shown in FIG. 12, a plurality of time domain locations of preconfigured CPEs are set. Access location groups of the plurality of CPEs may be separately set by using 9 μs, 16 μs, and 25 μs as time intervals. If an access location of a terminal device is before a boundary, the terminal device may start transmission by using a CPE. As shown in FIG. 12, the symbol 13 is divided into a 9-μs access location group, and each terminal device may select one of these access locations as a transmission start point according to a standard. Time domain locations corresponding to the terminal device 1 and the terminal device 2 are both located in the slot 1210, and the terminal device 1 and the terminal device 2 may perform transmission by using CPEs. The two terminal devices may synchronize additional LBT to the transmission start points, and start transmission in clear channel assessment (CCA). If an access location of a terminal device is behind a boundary, the terminal device starts transmission through AGC symbol puncturing. For example, if an access location selected by a specific terminal device appears in a symbol 0 of a slot 1220, the terminal device may start transmission through AGC symbol puncturing.

As mentioned above, in sidelink communication, a terminal device may need a periodic channel resource to perform periodic transmission. In this case, some resources are usually reserved in a resource pool for periodic or predictable data transmission. Information about the reserved resources may be indicated by using SCI information.

In some embodiments, if a first shared resource is shared by a first terminal device, the first terminal device may predefine/preconfigure, based on resource reservation information, a first CPE or a first CPE group corresponding to the resource reservation information. The first CPE or the first CPE group is the foregoing default CPE. There may be one or more time domain locations of the default CPE.

Optionally, the first CPE or the first CPE group is used to perform channel access by a terminal device corresponding to the resource reservation information. In other words, the resource reservation information may be used as a criterion for a terminal device to select a CPE from a plurality of CPEs or CPE groups.

Optionally, the resource reservation information may include resource reservation information of a terminal device that performs COT sharing, or may include resource reservation information of another terminal device.

Optionally, the resource reservation information may be carried in the SCI information. The SCI information may further indicate whether the resource reservation information is available. When the resource reservation information is used by a second terminal device to send a sidelink channel, if the resource reservation information is available, a time domain location of the first CPE or any CPE in the first CPE group may be used by the second terminal device to perform channel access. If the resource reservation information is unavailable, the CPE used by the second terminal device to perform channel access may be determined based on a priority of the sidelink channel.

For example, if resource reservation information of a transmission resource slot is available, transmission of the terminal device starts from a time domain location of the default CPE. If resource reservation information of a transmission resource slot is unavailable, transmission of a terminal device starts from a subset of a plurality of CPE time domain locations based on service priorities. The terminal device may randomly select a CPE time domain location from the subset of the plurality of CPE time domain locations.

Optionally, when there is a reserved resource in the first shared resource, the second terminal device may determine, based on measured signal quality, whether the reserved resource can be used for transmission. For example, if reference signal received power (RSRP), on a reserved resource of another terminal device, measured by the second terminal device is less than an RSRP threshold of a sidelink, the second terminal device may use a resource overlapping the reserved resource for PSCCH/PSSCH transmission performed by the second terminal device. The second terminal device may randomly select a time domain location of one CPE from a time domain location of one or more CPEs that are (pre)configured based on a priority of PSCCH/PSSCH transmission.

Optionally, a resource selected by the second terminal device may overlap a reserved resource of another terminal device in time domain. Although the two resources overlap in time domain, the two resources may be interlaced in frequency domain. Therefore, regardless of whether the second terminal device performs PSCCH/PSSCH transmission by using a complete RB set or a partial RB set, the second terminal device may use the time domain location of the default CPE.

In some embodiments, for resource allocation of the partial RB set, the second terminal device may select a CPE time domain location based on detected reservation information and the highest priority in the sent reservation information. If there is no reservation information, the CPE time domain location is selected based on a priority of the second terminal device.

The foregoing describes the method embodiments of the present application in detail with reference to FIG. 1 to FIG. 12. The apparatus embodiments of the present application are described in detail below with reference to FIG. 13 and FIG. 14. It should be understood that the description of the apparatus embodiments corresponds to the description of the method embodiments, and therefore, for parts that are not described in detail, reference may be made to the foregoing method embodiments.

Figure 13:
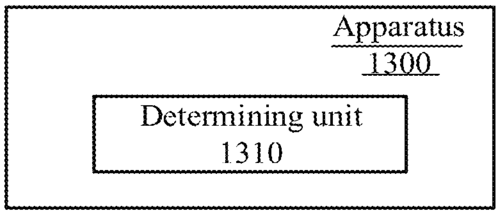
FIG. 13 is a schematic diagram of a structure of an apparatus for sidelink communication according to an embodiment of the present application.

FIG. 13 is a schematic block diagram of an apparatus for wireless communication according to an embodiment of the present application. The apparatus 1300 may be any terminal device described above. The apparatus 1300 shown in FIG. 13 includes a determining unit 1310.

The determining unit 1310 may be configured to determine first configuration information of a first shared resource. The first configuration information indicates one or more CPEs corresponding to the first shared resource. The one or more CPEs are determined based a subcarrier spacing corresponding to the first shared resource. The one or more CPEs are used by a second terminal device to determine a time domain location for accessing the first shared resource.

Optionally, the first configuration information further indicates a time domain resource in which the one or more CPEs are located. One or more time domain locations corresponding to the one or more CPEs are determined based on a first time interval. The first time interval is one of following time intervals: a time interval between the 1$^{st}$ CPE in the one or more CPEs and a start location of the time domain resource; a time interval between two adjacent CPEs in the one or more CPEs; and a time interval for determining the time domain location of the one or more CPEs.

Optionally, a time length of the first time interval includes one or more of following: 9 microseconds, 16 microseconds, and 25 microseconds.

Optionally, a time domain location of any one of the one or more CPEs meets a following condition:

$$\{T_{sym} + \delta T\}.$$

Herein, $T_{sym}$ is the start location of the time domain resource, $\delta T$ is a second time interval between any CPE and the start location of the time domain resource, and the second time interval includes one or more first time intervals.

Optionally, the time domain resource in which the one or more CPEs are located is determined based on one or more of following information: the subcarrier spacing; a duration of the first shared resource; and whether the first shared resource includes a reserved resource.

Optionally, the time domain resource in which the one or more CPEs are located includes one symbol or two consecutive symbols.

Optionally, the first shared resource is used by the second terminal device to send a sidelink channel. A priority associated with the one or more CPEs is used by the second terminal device to determine a CPE for performing channel access. The priority includes one or more of following: a service priority corresponding to the sidelink channel; and a CAPC corresponding to the sidelink channel.

Optionally, the first configuration information indicates M CPEs. The M CPEs are used by N terminal devices to perform channel access in a first time period. If N>M, a terminal device that accesses the first shared resource by using the M CPEs in the N terminal devices is determined based on one or more of following information: a time period in which the N terminal devices wait for access; the earliest time point at which the N terminal devices initiate an access request; and a service priority corresponding to to-be-transmitted data of the N terminal devices.

Optionally, the first shared resource is shared by the first terminal device. The time period in which the N terminal devices wait for access is related to a duration of a timer started by the first terminal device. The apparatus 1300 further includes: a start unit that may be configured to: in response to an access request of a terminal device that earliest performs channel access in the N terminal devices, start the timer. The timer is used by the first terminal device to determine a value of N.

Optionally, when N>M, a first parameter of the terminal device that accesses the first shared resource by using the M CPEs in the N terminal devices meets a following condition:

$$\min\left(\frac{\alpha \times t_i}{T} + \frac{\beta \times Q_i}{K}\right).$$

Herein, α and β represent weight factors, $t_1$ represents a time period between a time point at which a terminal device i in the N terminal devices initiates an access request and the earliest time point at which the access request is initiated, i is a natural number from 0 to N−1, T represents the first time period, $Q_i$ represents a service priority corresponding to to-be-transmitted data of the terminal device i in the N terminal devices, $Q_i$ is a natural number from 1 to K, K>1, and K represents the lowest priority.

Optionally, the first configuration information is sent over a shared spectrum. The first configuration information is carried in a first sidelink channel. The first sidelink channel includes first-phase SCI and second-phase SCI. The first configuration information is carried in the first-phase SCI and/or the second-phase SCI.

Optionally, the first configuration information further indicates one or more CPE groups in which a plurality of CPEs are located. The one or more CPE groups are determined based on one or more of following information: priorities associated with the CPEs; time intervals corresponding to the plurality of CPEs; and whether the CPEs are CPEs corresponding to resource reservation information.

Optionally, the first configuration information further indicates a configuration parameter of the one or more CPE groups. The configuration parameter of the one or more CPE groups includes one or more of following: a time domain resource in which the CPE group is located; a time domain location corresponding to the CPE group; one or more start time domain locations corresponding to the CPE group; a time domain location corresponding to each CPE in the CPE group; one or more first time intervals of the CPE group; and ID information of the CPE group.

Optionally, the configuration parameter of the one or more CPE groups includes a plurality of start time domain locations corresponding to the CPE group. The CPE corresponds to a plurality of first time intervals. The plurality of start time domain locations include a plurality of start time domain locations that are determined for the CPE group based on the plurality of first time intervals.

Optionally, the first shared resource is shared by the first terminal device. The apparatus 1300 further includes a configuring unit that may be configured to predefine/preconfigure, based on resource reservation information, a first CPE or a first CPE group corresponding to the resource reservation information.

Optionally, the resource reservation information is used by the second terminal device to send the sidelink channel.

If the resource reservation information is available, a time domain location of the first CPE or any CPE in the first CPE group is used by the second terminal device to perform channel access; or if the resource reservation information is unavailable, the CPE used by the second terminal device to perform channel access is determined based on the priority of the sidelink channel.

Optionally, the first configuration information is used by the first terminal device to perform semi-static configuration on the one or more CPEs, and the semi-static configuration is used to instruct the second terminal device to determine the CPE for performing channel access, in one or more of following information: random access, a hash function, a service characteristic of the second terminal device, and a priority corresponding to the second terminal device.

Figure 14:
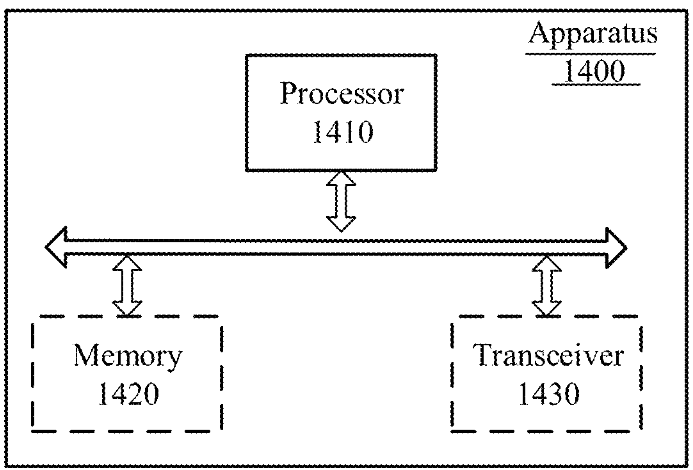
FIG. 14 is a schematic diagram of a structure of a communications apparatus according to an embodiment of the present application.

FIG. 14 is a schematic diagram of a structure of a communication apparatus according to an embodiment of the present application. Dashed lines in FIG. 14 indicate that a unit or module is optional. The apparatus 1400 may be configured to implement the methods described in the foregoing method embodiments. The apparatus 1400 may be a chip or a terminal device.

The apparatus 1400 may include one or more processors 1410. The processor 1410 may support the apparatus 1400 in implementing the methods described in the foregoing method embodiments. The processor 1410 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1400 may further include one or more memories 1420. The memory 1420 stores a program that may be executed by the processor 1410, so that the processor 1410 performs the methods described in the foregoing method embodiments. The memory 1420 may be independent of the processor 1410 or may be integrated into the processor 1410.

The apparatus 1400 may further include a transceiver 1430. The processor 1410 may communicate with another device or chip through the transceiver 1430. For example, the processor 1410 may send and receive data to and from another device or chip through the transceiver 1430.

An embodiment of the present application further provides a computer-readable storage medium for storing a program. The computer-readable storage medium may be used in the terminal device or the network device provided in embodiments of the present application, and the program causes a computer to perform the methods to be performed by the terminal device or the network device in various embodiments of the present application.

The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

An embodiment of the present application further provides a computer program product. The computer program product includes a program. The computer program product may be used in the terminal device or the network device provided in embodiments of the present application. The program enables a computer to perform the methods to be performed by the terminal device or the network device in various embodiments of the present application.

All or some of the foregoing embodiments may be implemented by software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, all or some procedures or functions in embodiments of the present application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, wireless, or microwave) manner.

An embodiment of the present application further provides a computer program. The computer program may be applied to the terminal device or the network device provided in embodiments of the present application. The computer program causes a computer to perform the methods to be performed by the terminal device or the network device in various embodiments of the present application.

The terms "system" and "network" in the present application may be used interchangeably. In addition, the terms used in the present application are only used to explain the specific embodiments of the present application, and are not intended to limit the present application. In the specification, claims, and accompanying drawings of the present application, the terms "first", "second", "third", "fourth" and so on are intended to distinguish between different objects but do not describe a particular order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained based on A; or may mean that A indirectly indicates B, for example, A indicates C, and B may be obtained based on C; or may mean that there is an association relationship between A and B.

In embodiments of the present application, the term "correspond" may indicate that there is a direct or indirect correspondence between the two, or may indicate that there is an association relationship between the two, which may also be a relationship such as indicating and being indicated, or configuring and being configured.

In embodiments of the present application, "predefined" or "preconfigured" may be implemented by prestoring corresponding codes, tables, or other forms that can indicate related information in devices (for example, including the terminal device and the network device). A specific implementation thereof is not limited in the present application. For example, predefined may indicate defined in the protocol.

In embodiments of the present application, the "protocol" may indicate a standard protocol in the communication field, and may include, for example, an LTE protocol, an NR protocol, and a related protocol applied to a future communication system. This is not limited in the present application.

In embodiments of the present application, determining B based on A does not mean determining B based on only A, but instead B may be determined based on A and/or other information.

In embodiments of the present application, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the foregoing described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between apparatuses or units may be implemented in electrical, mechanical, or other forms.

The units described as separate parts may be or may not be physically separated, and parts displayed as units may be or may not be physical units, and may be at one location, or may be distributed on a plurality of network elements. Some or all of the units may be selected according to actual requirements to achieve the objectives of the solutions of embodiments.

In addition, functional units in embodiments of the present application may be integrated into one processing unit, each of the units may exist alone physically, or two or more units are integrated into one unit.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for sidelink communication, comprising:

determining, by a first terminal device and based on a subcarrier spacing corresponding to a first shared resource, a plurality of access point extensions (CPEs) corresponding to the first shared resource, wherein the plurality of CPEs correspond to the same subcarrier spacing, and using the plurality of CPEs to receive a sidelink channel on the first shared resource, wherein a time domain location corresponding to each of the plurality of CPEs is determined based on a CPE configuration, and the CPE configuration configures multiple time interval values between adjacent CPEs, wherein the plurality of CPEs comprises a first CPE, a second CPE, and a third CPE, wherein the first CPE is adjacent to the second CPE, and the second CPE is adjacent to the third CPE, and a time interval between the first CPE and the second CPE is different from a time interval between the second CPE and the third CPE.

2. The method according to claim 1, wherein a third time interval between a second CPE and a start location of a time domain resource of the first shared resource comprises one or more of following: 9 microseconds, 16 microseconds, or 25 microseconds.

3. The method according to claim 1, wherein a time domain resource in which the plurality of CPEs are located is determined based on one or more of following information:

the subcarrier spacing;

a duration of the first shared resource; and whether the first shared resource comprises a reserved resource.

4. The method according to claim 3, wherein the time domain resource in which the plurality of CPEs are located comprises one symbol or two consecutive symbols.

5. The method according to claim 1, wherein each of the plurality of CPEs corresponds to a channel access priority class (CAPC).

6. The method according to claim 1, wherein the received sidelink channel is associated with a service priority.

7. The method according to claim 1, wherein the plurality of CPEs comprises M CPEs, the M CPEs are used by N terminal devices to perform channel access in a first time period, and both M and N are natural numbers greater than 0; and when N>M, a terminal device that accesses the first shared resource by using the M CPEs in the N terminal devices is determined based on one or more of following information:

a time period in which the N terminal devices wait for access;

an earliest time point at which the N terminal devices initiate an access request; and a service priority corresponding to to-be-transmitted data of the N terminal devices.

8. The method according to claim 7, wherein the first shared resource is shared by the first terminal device, the time period in which the N terminal devices wait for access is related to a duration of a timer started by the first terminal device, and the method further comprises:

in response to an access request of a terminal device that earliest performs channel access in the N terminal devices, starting, by the first terminal device, the timer, wherein the timer is used by the first terminal device to determine a value of N.

9. The method according to claim 7, wherein when N>M, a first parameter of the terminal device that accesses the first shared resource by using the M CPEs in the N terminal devices meets a following condition:

$$\min\left(\frac{\alpha \times t_i}{T} + \frac{\beta \times Q_i}{K}\right),$$

wherein α and β represent weight factors, $t_i$ represents a time period between a time point at which a terminal device i in the N terminal devices initiates an access request and the earliest time point at which the access request is initiated, i is a natural number from 0 to N−1, T represents the first time period, $Q_i$ represents a service priority corresponding to to-be-transmitted data of the terminal device i in the N terminal devices, $Q_i$ is a natural number from 1 to K, K>1, and K represents the lowest priority.

10. The method according to claim 1, comprising:

sending first configuration information in a first sidelink channel, wherein the first configuration information indicates the plurality of CPEs, the first sidelink channel comprises first-phase sidelink control information (SCI) and second-phase SCI, and the first configuration information is carried in at least one of the first-phase SCI or the second-phase SCI.

11. The method according to claim 1, wherein the plurality of CPEs are comprised in one or more CPE groups, and the one or more CPE groups are determined based on one or more of following information:

priorities associated with the plurality of CPEs;

time intervals corresponding to the plurality of CPEs; or whether the plurality of CPEs are CPEs corresponding to resource reservation information.

12. The method according to claim 11, wherein a configuration parameter of the one or more CPE groups comprises one or more of following:

a time domain resource in which the CPE group is located;

a time domain location corresponding to the CPE group;

one or more start time domain locations corresponding to the CPE group;

a time domain location corresponding to each CPE in the CPE group;

one or more first time intervals of the CPE group; or identity (ID) information of the CPE group.

13. The method according to claim 12, wherein the configuration parameter of the one or more CPE groups comprises a plurality of start time domain locations corresponding to the CPE group, the CPE corresponds to a plurality of first time intervals, and the plurality of start time domain locations comprise a plurality of start time domain locations that are determined for the CPE group based on the plurality of first time intervals.

14. The method according to claim 1, wherein the first shared resource is shared by the first terminal device, and the method further comprises:

preconfiguring, by the first terminal device based on resource reservation information, a first CPE or a first CPE group corresponding to the resource reservation information.

15. The method according to claim 14, wherein if the resource reservation information is available, a time domain location of the first CPE or any CPE in the first CPE group is used to perform channel access; or if the resource reservation information is unavailable, a CPE used to perform channel access is determined based on a priority of the sidelink channel.

16. The method according to claim 1, further comprising: performing semi-static configuration on the plurality of CPEs, wherein the semi-static configuration is determined based on one or more of following information: random access, a hash function, a service characteristic of a second terminal device, or a priority corresponding to the second terminal device.

17. An apparatus, comprising:

at least one processor; and one or more non-transitory computer-readable storage media coupled to the at least one processor and storing programming instructions for execution by the at least one processor, wherein the programming instructions, when executed, cause the apparatus to perform operations comprising:

determining, by a first terminal device and based on a subcarrier spacing corresponding to a first shared resource, a plurality of access point extensions (CPEs) corresponding to the first shared resource, wherein the plurality of CPEs correspond to the same subcarrier spacing, and using the plurality of CPEs to receive a sidelink channel on the first shared resource, wherein a time domain location corresponding to each of the plurality of CPEs is determined based on a CPE configuration, and the CPE configuration configures multiple time interval values between adjacent CPEs, wherein the plurality of CPEs comprises a first CPE, a second CPE, and a third CPE, wherein the first CPE is adjacent to the second CPE, and the second CPE is adjacent to the third CPE, and a time interval between the first CPE and the second CPE is different from a time interval between the second CPE and the third CPE.

18. One or more non-transitory computer-readable media storing computer instructions, that when executed by one or more processors, cause a computing device to perform operations comprising:

determining, by a first terminal device and based on a subcarrier spacing corresponding to a first shared resource, a plurality of access point extensions (CPEs) corresponding to the first shared resource, wherein the plurality of CPEs correspond to the same subcarrier spacing, and using the plurality of CPEs to receive a sidelink channel on the first shared resource, wherein a time domain location corresponding to each of the plurality of CPEs is determined based on a CPE configuration, and the CPE configuration configures multiple time interval values between adjacent CPEs, wherein the plurality of CPEs comprises a first CPE, a second CPE, and a third CPE, wherein the first CPE is adjacent to the second CPE, and the second CPE is adjacent to the third CPE, and a time interval between the first CPE and the second CPE is different from a time interval between the second CPE and the third CPE.

* * * * *